Patented Apr. 3, 1945

2,372,669

UNITED STATES PATENT OFFICE 2,372,669

PROCESS FOR THE PRODUCTION OF ABSORBENT MATERIALS

Clifford I. Haney and Mervin E. Martin, Cumberland, Md., assignors to Celanese Corporation of America, a corporation of Delaware No Drawing. Application June 18, 1941, Serial No. 398,547

12 Claims. (Cl. 18—47.5)

This invention relates to the production of porous materials, and more particularly to the production of highly absorbent porous materials comprising cellulose esters.

An object of our invention is the preparation of porous materials having a basis of an ester of cellulose.

Another object of our invention is the preparation of said porous materials in a rapid and economical manner and in any desired predetermined shape.

Other objects of our invention will appear from the following detailed description.

The preparation of porous materials having a basis of a derivative of cellulose and having sponge-like characteristics has been proposed heretofore and methods whereby these materials may be prepared have been suggested. According to one method, the organic derivative of cellulose is dissolved in a solvent to produce a viscous solution and there is incorporated therein a solid which is capable of being decomposed by heat or chemical treatment to yield a gas. After the solution has been set, or substantially set, the mass is then treated so as to decompose the gas-generating solid and the generation of the gas therefrom causes the formation of hollow spaces throughout the mass, resulting in a porous structure. The disadvantage of this process is that the pore size is variable and irregular, and there is difficulty in ensuring that all of gas-generating solid is decomposed. The decomposition products of the solids incorporated therein to form the pores must also be completely removed which is sometimes difficult. Unless complete decomposition and complete removal of decomposition products are effected the porous mass is not satisfactory for many purposes. In accordance with another method, a solution of a derivative of cellulose in a volatile solvent is prepared and inorganic salts of appreciable particle size are mixed therewith. After the solution has been suitably shaped and then set by removal of the solvent, the soluble salts are extracted with water from the body of the shaped cellulose derivative leaving behind a cellular mass or structure. The disadvantage of this process is that repeated extractions are necessary in order to remove the salts, and their complete removal is a lengthy and costly operation. In addition, the resulting cellular structure is also unsatisfactory for many purposes.

We have now discovered that soft, highly absorbent, sponge-like porous materials may be produced by the saponification, in whole or in part, of certain cellular materials having a basis of a cellulose ester. These cellular materials which are particularly suitable for the purposes of the present invention may be prepared by adding to a cellulose ester in finely divided form a volatile liquid which has in the vapor state at least a solvent, swelling or softening action thereon, subjecting the treated material to elevated temperature and pressure in a closed chamber and then, after the cellulose ester particles are at least partially converted, quickly releasing the pressure therefrom. The sudden release of the pressure while the treated material is at an elevated temperature allows the liquid absorbed therein to vaporize with extreme rapidity and the cellulose ester is expanded to a strong, firm cellular material. The saponification of the cellular materials produced in this way yields a soft, porous, sponge-like mass of even texture and high liquid absorbing power.

Conveniently the saponification of these cellular materials may be carried out by treatment with organic saponifying agents such as, for example, methyl amine, ethylene diamine, triethanolamine or other organic base, or it may be carried out with inorganic agents, such as, for example, sodium hydroxide, potassium hydroxide, sodium silicate, ammonium hydroxide, sodium carbonate, or other inorganic basic agent. The saponifying agents may be employed either in aqueous or in alcoholic solutions. Preferably, we employ alcoholic solutions of sodium or potassium hydroxide. The most desirable results may be obtained by saponifying these cellular materials in alcoholic solutions of potassium hydroxide in concentrations of from ½ to 1 N., and then washing out said saponifying solution with water. When employing alcoholic solutions of saponifying agents, it is sometimes preferable to follow the initial saponification in alcoholic potassium hydroxide and washing with water with a further saponification employing an aqueous solution of a saponifying agent. Thus, for example, the use of aqueous solutions of sodium hydroxide in the secondary saponification have been found to yield unusually soft and unusually absorbent materials. The aqueous solutions employed in the secondary saponification may have a concentration of from ½ to 5% but the concentrations are preferably from 1 to 3%.

The saponification may be continued until the cellulose ester comprising the cellular material is completely saponified or it may be interrupted before complete saponification has been effected, e. g., when the structure has been saponified to about ¾ of its weight. Thus, the saponification may be carried out for from 1 to 18 hours and at temperatures of from 20° to 100° C. depending upon the concentration of the saponifying agent and the speed and degree of saponification desired. Where aqueous solutions of the saponifying agents are employed, we prefer to carry out the saponification under pressure, using penetrants and elevated temperatures to ensure a suitable degree of saponification. In removing the saponifying agent by washing with water, the temperature of the wash water may be from 10 to 100° C. Preferably, we employ water at or near its boiling point in the washing treatment, at least in the early stages of washing. The best results are obtained by maintaining the saponified material in the boiling wash water for from 15 to 60 minutes and then washing the saponified materials with more water until neutral. The product may then be dried in any suitable manner.

The resulting porous material is highly absorbent. On soaking said dry materials in water it is observed that they are capable of absorbing from 7 to 15 grams of water per gram of sponge. When the porous material is squeezed under water and then allowed to absorb the liquid, it is observed that they are capable of absorbing from 10 to 25 grams of water per gram of sponge.

In the preparation of the cellular materials having a basis of a cellulose ester which may be saponified to yield the porous, absorbent materials of our invention, various liquids and liquid mixtures having a solvent, softening or swelling action in the vapor state on said cellulose esters (all of which are included in the term "having at least a swelling action" as used hereinafter in the claims), may be employed. Examples of the liquids or liquid mixtures which may be employed are acetone, ethyl alcohol, ethyl alcohol and benzol, water, chloroform, ethylene dichloride, acetone and ethyl or methyl alcohol, ethylene dichloride and ethyl or methyl alcohol, methyl chloride and ethyl or methyl alcohol, butenol, diacetone alcohol, as well as mixtures of the above mentioned organic liquids with various amounts of water. While all these liquids are suitable, we preferably use either acetone, butanol, ethyl alcohol, or mixtures of these liquids with water or benzol.

The liquids may be applied to the finely divided cellulose esters in various ways. The desired quantity of liquid or liquid mixture may be sprayed or sprinkled on to the cellulose ester which may be in the form of small particles or fibers and the mixture tumbled until the liquid is uniformly distributed throughout the mass. Alternatively, the cellulose ester particles or fibers may be exposed to the vapors of the solvent, softening or swelling liquid or liquid mixture until the desired quantity is absorbed therein, thereby obtaining a thorough distribution without the necessity for tumbling. Where desired a combination of both methods may be used. Satisfactory results may be obtained if from 1% to 40% of the solvent, softening or swelling agent is incorporated into the cellulose ester material. Preferably, however, we employ from 3% to 20% on the weight of the particles or fibers.

Conveniently, the finely divided cellulose ester having the liquid dispersed therein may be subjected to heat and pressure in any molding device wherein the temperature may be suitably controlled and wherein the pressure may be quickly released. Thus, a molding press may be used and the pressure may be applied to the finely divided cellulose ester material by placing said material in a suitably shaped mold and applying pressure thereto by means of a piston or plunger shaped to conform to the mold. Upon a sudden release of the pressure, the rapid expansion and vaporization of the liquid absorbed in the mass causes the material to expand greatly to a firm cellular structure which fills the mold. By utilizing a suitably shaped mold, the expanded cellular material may be obtained in any desired form or shape. If desired, the cellulose ester material under high pressure may be extruded through suitably shaped orifices and in this way cellular sheets, tubes, rods, etc. may be obtained which may be saponified to form porous, absorbent materials of like shape.

The pressure may be applied to the mold by mechanical means, by hydraulic means or by air or other gas under pressure. The pressure to which the material may be subjected will vary, depending upon the final product desired and may, for example, be from 1,000 to 20,000 lbs. per square inch. Preferably, however, the cellulose ester materials are subjected to pressures of somewhat over 5,000 lbs. per square inch, i. e., about 6,000 lbs. per square inch and the pressure then suddenly released to normal atmospheric pressure.

The heating of the mold or pressure chamber may be accomplished in any convenient manner, such, for example, as by steam or oil heating jackets surrounding the mold or pressure chamber, by heating the pressure chamber with gas flames, or by using electrical resistance coils. The temperature to which the finely divided material is heated will, of course, depend upon the amount of pressure applied and the time during which the material is maintained under said pressure. The temperature should be below the decomposition temperature of the particular cellulose ester being molded and may generally be from 140 to 250° C. Particularly desirable results are obtained with cellulose acetate, for example, by heating to about 200° C. The material may be placed in a cool mold or pressure chamber, then subjected to pressure therein and the mold or pressure chamber may then be brought up to the desired temperature and maintained at that temperature for the period of time desired. If desired, the heat may be applied while the pressure is being put on. In this way, objects of very low density may also be obtained which when saponified yield unusually soft and highly absorbent sponge-like masses.

When high pressures and temperatures are employed, the time during which the cellulose ester material is subjected to these conditions is relatively short. Maintaining the mold or pressure chamber closed for from ½ to 5 minutes may be ample, depending upon the size or thickness of the object being fabricated. Generally, a heating time from about 5 to 15 minutes is satisfactory.

Examples of cellulose esters that may be employed in the production of the porous absorbent articles of the present invention are, for example, cellulose acetate, cellulose propionate, cellulose butyrate, and mixed esters such as cellulose acetate-propionate and cellulose acetate-butyrate, and inorganic esters such as cellulose nitrate. Mixtures of one or more of the above esters may also be employed. Where cellulose acetate is used for preparing the cellular materials it may have an acetyl value of from 40 to 62.5% (calculated ac acetic acid).

In order to increase the strength or to modify the appearance or properties of the porous, absorbent, articles, fibrous or other fillers may be incorporated therein prior to expansion by molding or extrusion. Examples of such fibrous fillers are fibers of cotton, flax, hemp, ramie, jute and natural silk, while examples of other filling materials are cork, sawdust, wood shavings, clay, asbestos, etc., or mixtures of these. The use of water-soluble fillers which may later be removed during the washing treatment has been found to yield sponge-like masses whose softness is enhanced considerably. Such water-soluble fillers as, for example, sodium bicarbonate, sodium chloride, ammonium bicarbonate, sodium acetate, ammonium phosphate, sodium sulphate, sodium borate, sodium citrate and sodium potassium tartrate have all been found suitable. In employing these water-soluble fillers they are preferably ground to pass through a fairly fine screen, such as, for example, a 40-mesh screen. In addition, pigments may be incorporated in the material or the material may be dyed to obtain color effects. The cellulose esters may also be treated with suitable plasticizers before they are expanded. Any suitable plasticizer may be employed such as, for example, dimethyl phthalate, diethyl phthalate, dibutyl tartrate, triphenyl phosphate, tricresyl phosphate, dibutyl phthalate and mono-ethyl-p-toluene sulfonamide. Various fire retardants may also be incorporated therein and particular mention may be made of the brominated aromatic compounds, i. e., brominated tricresyl phosphate or tribromacetanilide.

The products made in accordance with our invention may be put to a large variety of uses. The materials, when saponified in whole or in part, are particularly suitable for use as a substitute for natural sponges since they are soft and highly absorbent. They may be used for various surgical and sanitary purposes such as for dressings, pads, tampons, and the like, and for photographic purposes, such as the removal of excess liquid from wet photographic film. Due to their low density, the materials are also very useful as heat insulating material in refrigerators and in pipe coverings, and due to their porosity they may be used as a structural sound proofing material. They may also be used for covering or insulating electrical equipment, or, when made into relatively thin discs or sheets, may be used for filtration purposes.

In order further to illustrate our invention, but without being limited thereto, the following examples are given:

*Example I*

Cellulose acetate having an acetyl value of 54.5% is ground to pass a 40 mesh screen and 10% by weight of ethyl alcohol is sprayed on to the particles. The moist particles are tumbled for 3 hours until the liquid is evenly distributed throughout the mass. 10 parts by weight of the treated particles are placed in the hot mold of a molding press which has been heated to 200° C. and a pressure of 3,000 lbs. per square inch is applied to the mass. After this pressure is applied to the mass. After this pressure is suddenly released and the cellulose acetate expands to a cellular mass having a density of 0.10.

The cellular mass of cellulose acetate thus obtained is then saponified by immersing it for 18 hours in a 1/N solution of alcoholic potassium hydroxide maintained at 30° C. After the saponification, the sponge-like mass of regenerated cellulose is drained free of the saponifying solution and is then immersed in boiling water for 15 minutes after which it is washed with water until neutral and dried at 100° C. The resulting spongy mass is quite soft and is highly absorbent and has a density of 0.085. Upon testing its absorbent properties it is found that the sponge is capable of absorbing 10.6 grams of water per gram of sponge.

*Example II*

Cellulose acetate having an acetyl value of 54.5% is ground to pass a 40 mesh screen and 5% by weight of butanol is sprayed on the particles. 10 parts by weight of the treated particles are placed in the hot mold of a molding press which has been heated to 200° C. and a pressure of 1,000 lbs. per square inch is applied to the mass. After this pressure is maintained for 1 minute, the pressure is suddenly released and the cellulose acetate expands to a cellular mass having a density of 0.08.

The cellular mass of cellulose acetate thus obtained is then saponified by immersing for 18 hours in a 1/N solution of alcoholic potassium hydroxide maintained at 30° C. After the saponification, the sponge-like mass of regenerated cellulose is drained free of the saponifying solution and is then immersed in boiling water for 15 minutes after which it is washed with water. It is then boiled 1 hour in a 1% solution of aqueous sodium hydroxide before it is washed neutral, and dried. The resulting spongy mass is quite soft and is highly absorbent and has a density of .057. Upon testing its absorbent properties it is found that the sponge is capable of absorbing 17.1 grams of water per gram of sponge.

*Example III*

Cellulose acetate having an acetyl value of 54.5% is ground to pass a 40 mesh screen, to it is added 3% by weight of sodium sulfate, and 5% by weight of butanol is sprayed on the particles. 10 parts by weight of the treated mixture are placed in an extruder which has been heated to 200° C. and a pressure of 6,000 lbs. per square inch is applied to the mass. The mixture is melted and extruded. As the pressure is suddenly released, the cellulose acetate expands giving a cellular mass of .05 density.

The cellular mass of cellulose acetate thus obtained is then saponified by heating in a 1/N alcoholic potassium hydroxide solution at 70° C. under a reflux condenser for 3 hours. After the saponification the sponge-like mass of regenerated cellulose is drained free of saponifying solution and is then placed in boiling water for 30 minutes after which it is washed neutral with water and dried. The resulting spongy mass is quite soft and is highly absorbent and has a density of .035. Dissolving out the sodium sulfate from the product, during the washing operation, causes the sponge to be softer and more porous than those of the previous examples.

*Example IV*

52½ grams of cellulose acetate having an acetyl value of 54.5% is ground to pass a 40 mesh screen and is mixed with 14 grams of rock salt also ground to pass a 40 mesh screen, and with 3½ grams of butanol. This mixture is heated to 210° C. in a closed cylinder under pressure for 5 minutes, then extruded through a ¼" jet.

The expanded cellulose acetate is soft and has a fine uniform cellular structure.

This material is cut into 1½ inch lengths and saponified by heating at 65° C. for 3 hours in 1/N alcoholic potassium hydroxide solution. After saponification, the alcoholic potash is drained from the sponges. They are then immersed in boiling water for 30 minutes, washed neutral with alternate hot and cold water washes, and dried at 100° C.

The resulting sponges are quite soft with a density of .06. Upon testing their absorbent properties, it is found that the sponge is capable of absorbing 20 grams of water per gram of sponge.

It is to be understood that the foregoing detailed description is merely given by way of illustration and that many variations may be made therein without departing from the spirit of our invention.

Having described our invention, what we desire to secure by Letters Patent is:

1. Process for the production of absorbent, porous materials, which comprises adding to a cellulose ester in finely divided form a quantity of a liquid having at least a swelling action thereon in an amount of from 1 to 40% on the weight of the cellulose ester, subjecting said treated material while in finely divided form to the action of a temperature above the normal boiling point of said liquid and a pressure of at least 1,000 pounds per square inch, quickly releasing the pressure and then subjecting the resulting cellular mass to the action of a saponifying agent.

2. Process for the production of absorbent, porous materials, which comprises adding to a cellulose ester in finely divided form a quantity of a liquid, which in the vapor state has at least a swelling action thereon in an amount of from 1 to 40% on the weight of the cellulose ester, subjecting said treated material while in finely divided form, to the action of a temperature above the normal boiling point of said liquid and a pressure of at least 1,000 pounds per square inch, quickly releasing the pressure and then subjecting the resulting cellular mass to the action of a saponifying agent.

3. Process for the production of absorbent, porous materials, which comprises adding to an organic ester of cellulose in finely divided form a quantity of a liquid having at least a swelling action thereon in an amount of from 1 to 40% on the weight of the cellulose ester, subjecting said treated material while in finely divided form to the action of a temperature above the normal boiling point of said liquid and a pressure of at least 1,000 pounds per square inch, quickly releasing the pressure and then subjecting the resulting cellular mass to the action of a saponifying agent.

4. Process for the production of absorbent, porous materials, which comprises adding to an organic ester of cellulose in finely divided form a quantity of a liquid, which in the vapor state has at least a swelling action thereon in an amount of from 1 to 40% on the weight of the cellulose ester, subjecting said treated material while in finely divided form to the action of a temperature above the normal boiling point of said liquid and a pressure of at least 1,000 pounds per square inch, quickly releasing the pressure and then subjecting the resulting cellular mass to the action of a saponifying agent.

5. Process for the production of absorbent, porous materials, which comprises adding to cellulose acetate in finely divided form a quantity of a liquid having at least a swelling action thereon in an amount of from 1 to 40% on the weight of the cellulose ester, subjecting said treated material while in finely divided form to the action of a temperature above the normal boiling point of said liquid and a pressure of at least 1,000 pounds per square inch, quickly releasing the pressure and then subjecting the resulting cellular mass to the action of a saponifying agent.

6. Process for the production of absorbent, porous materials, which comprises adding to cellulose acetate in finely divided form a quantity of a liquid, which in the vapor state has at least a swelling action thereon in an amount of from 1 to 40% on the weight of the cellulose ester, subjecting said treated material while in finely divided form to the action of a temperature above the normal boiling point of said liquid and a pressure of at least 1,000 pounds per square inch, quickly releasing the pressure and then subjecting the resulting cellular mass to the action of an alcoholic solution of a saponifying agent.

7. Process for the production of absorbent, porous materials, which comprises adding to cellulose acetate in finely divided form, which has mixed therewith a water-soluble filling material, a quantity of a liquid having at least a swelling action thereon in an amount of from 1 to 40% on the weight of the cellulose ester, subjecting said treated material while in finely divided form to the action of a temperature above the normal boiling point of said liquid and a pressure of at least 1,000 pounds per square inch, quickly releasing the pressure, subjecting the resulting cellular mass to the action of an alcoholic solution of a saponifying agent and then removing said saponifying agent and filling material from the body of the saponified material by treating said material with water.

8. Process for the production of absorbent, porous materials, which comprises adding to cellulose acetate in finely divided form a quantity of a liquid having at least a swelling action thereon in an amount of from 1 to 40% on the weight of the cellulose ester, subjecting said treated materials while in finely divided form to the action of a temperature above the normal boiling point of said liquid and a pressure of at least 1,000 pounds per square inch, quickly releasing the pressure, subjecting the resulting cellular mass to the action of an alcoholic solution of an inorganic saponifying agent and then removing said saponifying agent from the body of the material by treating said material with water.

9. Process for the production of absorbent, porous materials, which comprises adding to cellulose acetate in finely divided form a quantity of a liquid having at least a swelling action thereon in an amount of from 1 to 40% on the weight of the cellulose ester, subjecting said treated material while in finely divided form to the action of a temperature above the normal boiling point of said liquid and a pressure of at least 1,000 pounds per square inch, quickly releasing the pressure, subjecting the resulting cellular mass to the action of an alcoholic solution of potassium hydroxide, removing said saponifying agent from the body of the material by treating said material with water and then subjecting the material to a further saponification with an aqueous solution of a saponifying agent.

10. Process for the production of absorbent, porous materials, which comprises adding to cellulose acetate in finely divided form from 1 to 40% of a liquid comprising ethyl alcohol, subjecting said treated material while in finely divided form to the action of a temperature above the normal boiling point of said liquid and a pressure of at least 1,000 pounds per square inch, quickly releasing the pressure, subjecting the resulting cellular mass to the action of an alcoholic solution of potassium hydroxide and then removing said saponifying agent from the body of the material by treating said material with water.

11. Process for the production of absorbent, porous materials, which comprises adding to cellulose acetate in finely divided form from 1 to 40% of a liquid comprising butanol, subjecting said treated material while in finely divided form to the action of a temperature above the normal boiling point of said liquid and a pressure of at least 1,000 pounds per square inch, quickly releasing the pressure, subjecting the resulting cellular mass to the action of an alcoholic solution of potassium hydroxide, removing said saponifying agent from the body of the material by treating said material with boiling water and then subjecting the material to a further saponification with an aqueous solution of sodium hydroxide.

12. Process for the production of absorbent, porous materials, which comprises adding to cellulose acetate in finely divided form from 1 to 40% of a liquid comprising ethyl alcohol, subjecting said treated material while in finely divided form to the action of a temperature above the normal boiling point of said liquid and a pressure of at least 1,000 pounds per square inch, quickly releasing the pressure, subjecting the resulting cellular mass to the action of a saponifying agent comprising a 1/N alcoholic solution of potassium hydroxide and then removing said saponifying agent from the body of the material by treating said material with boiling water for 30 minutes and then washing with water until it is neutral.

CLIFFORD I. HANEY.
MERVIN E. MARTIN.